United States Patent
Hemmeter et al.

(10) Patent No.: US 8,026,474 B2
(45) Date of Patent: Sep. 27, 2011

(54) DEVICE FOR TRANSFERRING LIGHT SIGNALS BETWEEN TWO ELEMENTS RELATIVELY MOVABLE TO ONE ANOTHER

(75) Inventors: Georg Hemmeter, Erlangen (DE); Günter Schwesig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 383 days.

(21) Appl. No.: 12/316,380

(22) Filed: Dec. 11, 2008

(65) Prior Publication Data

US 2009/0152442 A1 Jun. 18, 2009

(30) Foreign Application Priority Data

Dec. 17, 2007 (EP) .................................... 07024426

(51) Int. Cl.
*G01D 5/34* (2006.01)
*G01J 5/08* (2006.01)
*G02B 27/00* (2006.01)

(52) U.S. Cl. ............... 250/231.13; 250/227.14; 250/551

(58) Field of Classification Search .................. 250/221, 250/205, 231.13–231.18, 227.24, 227.11, 250/551; 385/15, 24–26; 307/10.1; 341/13, 341/14; 356/614–617, 620, 138, 139.09, 356/152.1; 359/436; 378/4, 15
See application file for complete search history.

(56) References Cited

U.S. PATENT DOCUMENTS

| 4,310,767 | A |  | 1/1982 | Peacock |
|---|---|---|---|---|
| 5,016,961 | A | * | 5/1991 | Aldrich ........................... 385/25 |
| 5,469,488 | A | * | 11/1995 | Ono ................................ 378/15 |
| 6,434,293 | B1 | * | 8/2002 | Igeta et al. ...................... 385/25 |
| 6,563,109 | B1 | * | 5/2003 | Kosters ..................... 250/237 G |
| 6,937,787 | B2 | * | 8/2005 | Schilling et al. ............... 385/26 |
| 6,958,468 | B2 | * | 10/2005 | Kataoka ................... 250/231.13 |
| 7,534,992 | B2 | * | 5/2009 | Koitabashi ............... 250/231.13 |
| 2002/0015469 | A1 | * | 2/2002 | Oshima et al. .................. 378/15 |
| 2004/0141686 | A1 |  | 7/2004 | Schilling et al. |

FOREIGN PATENT DOCUMENTS

| DE | 10302435 B3 | 7/2004 |
|---|---|---|
| EP | 0432922 A2 | 6/1991 |
| EP | 1187152 A2 | 3/2002 |
| JP | 2013143 A1 | 1/1990 |
| JP | 04154226 A | 5/1992 |

* cited by examiner

*Primary Examiner* — Que T Le
*Assistant Examiner* — Pascal M Bui Pho

(57) ABSTRACT

To ensure an energy-efficient transfer of light signals between two elements of a machine which are movable relative to one another, a device and a method for transferring light signals between such elements is provided. A first element has a plurality of light sources for delivering light signals and a second element has at least one photoreceiver for receiving the light signals. A unit causing the turning on or off is configured such as to effect a turning on or off of only one portion of the light sources.

16 Claims, 1 Drawing Sheet

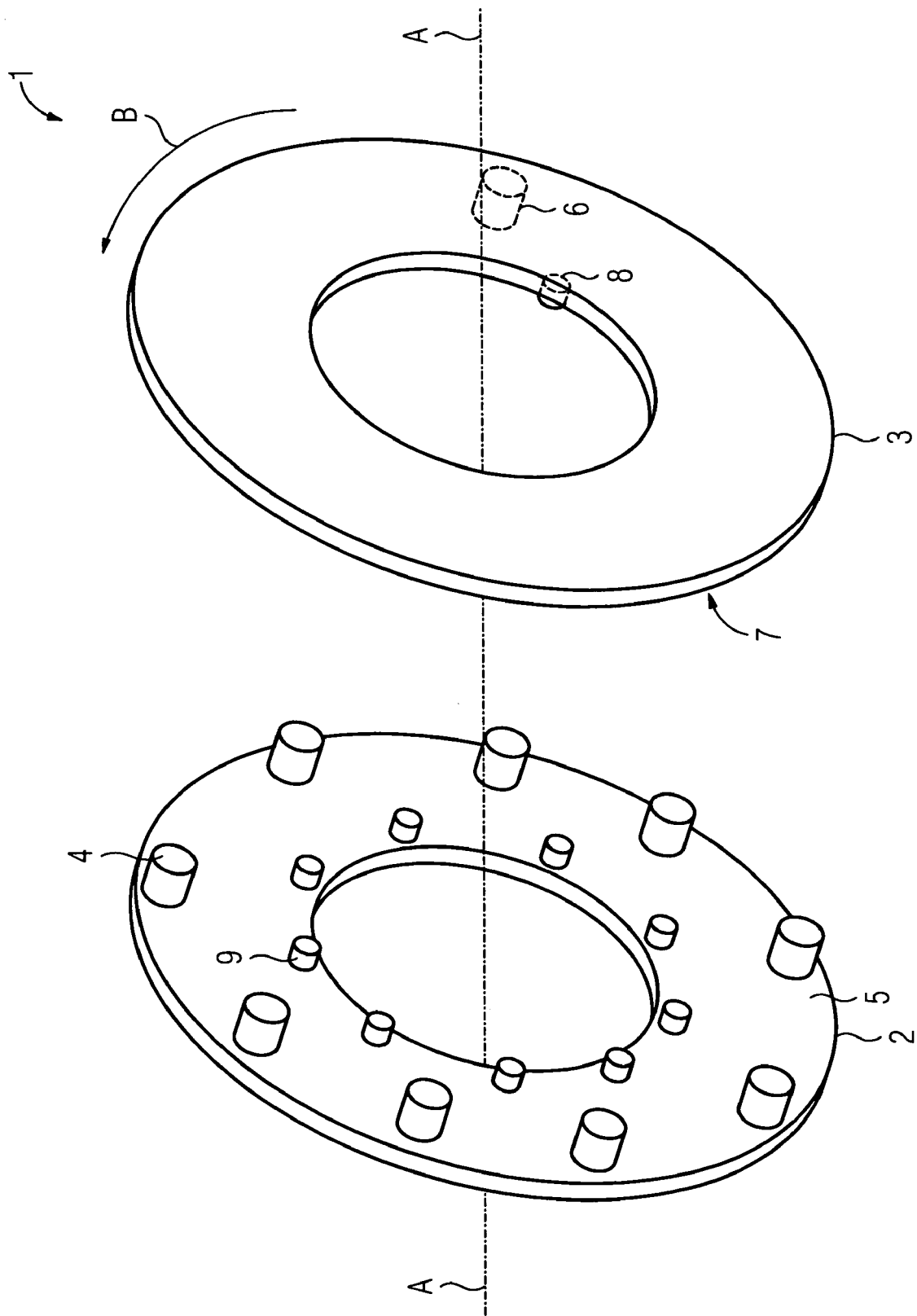

DEVICE FOR TRANSFERRING LIGHT SIGNALS BETWEEN TWO ELEMENTS RELATIVELY MOVABLE TO ONE ANOTHER

CROSS REFERENCE TO RELATED APPLICATIONS

This application claims priority of European Patent Office application No. 07024426.4 EP filed Dec. 17, 2007, which is incorporated by reference herein in its entirety.

FIELD OF INVENTION

The present invention relates to a device for transferring light signals between two elements of a machine which are movable relative to one another, in particular of a machine tool, on which a first of the elements has a group of light sources for delivering such light signals and a second of the elements has at least one photoreceiver for receiving the light signals. Moreover, the invention relates to a corresponding method.

Of interest in the present case is a transfer of information, in particular of field bus signals, between machine elements which move relative to one another. The relative movement in this situation is understood in particular to be a rotary movement. The concept however also includes other types of movement, such as a linear movement for example.

BACKGROUND OF INVENTION

In the case of known machine tools and production machines, such as multi-spindle automatic lathes or rotary tables for example, electric motors, polyphase machines in particular, are arranged on a machine member which is capable of moving in a rotary fashion. In this situation, any drive control facilities and also a power electronics facility, such as line-commutated rectifiers, self-commutated rectifiers or unregulated rectifiers and inverters, for operating the motors are normally located in a control cabinet. In this situation, the power lines are as a rule routed out of the control cabinet in the direction of the motors.

On these machine tools and production machines, in which the power lines are used for connecting the power electronics facility to the machine part which is capable of moving in a rotary fashion, the circumstance in which no "continuous rotation" of the moved machine part can be executed in order to reduce the work piece processing times is to be regarded as disadvantageous. Furthermore, the power lines wear out relatively quickly as a result of the permanent bending and torsional stress. Moreover, replacement of the power lines in the event of a fault is extremely complicated on account of a complex machine design.

As a result, machine tools and production machines having the "continuous rotation" functionality are nowadays being used with increasingly frequency. Such types of machines are thus already known from the prior art. In this situation, the transfer of energy normally takes place by way of collector rings, or inductively, whereby the inductive transfer of energy denotes a considerable additional requirement in terms of power electronics.

Serial bus systems are used for the communication considered in the present case between fixed components, such as a control unit for example, and the rotatable components, such as a drive control facility for example. In this situation, the transfer of data can likewise take place by way of collector rings as in the case of the transfer of energy. In the present case, however, the invention is concerned with a transfer of information by means of light signals. With regard to the devices known from the prior art for transferring light signals between two elements of a machine which are movable relative to one another, glass or plastic bodies are fed with modulated light, whereby the lightwave signals constitute the protocol for the serial communication path.

SUMMARY OF INVENTION

In the case of the devices known from the prior art for transferring light signals between two elements of a machine which are movable relative to one another the data stream is generated by means of a plurality of light sources and is subsequently fed or emitted directly into the glass or plastic bodies. One disadvantage of this implementation consists in the fact that the power requirement is considerably increased as a result of the plurality of light sources. Thus, in the case of this known transfer system, a separate connection is required for a voltage or power supply because the power supplies introduced in the standard bus lines or introduced with regard to special bus systems do not suffice. On the other hand, the necessary number of light sources which can be used for the data transfer is limited by the amount of power available.

An object of the present invention is to propose a device and also a method in which measures are taken that guarantee an energy-efficient transfer of light signals between two elements of a machine which are movable relative to one another.

This object is achieved according to the invention by a device and also by a method according to the independent claims. Advantageous embodiments with useful developments of the invention are set down in the dependent claims.

A device according to the invention is designed for transferring light signals between two elements of a machine, in particular of a machine tool, which are movable relative to one another. In this situation, a first of the elements has a group of light sources for delivering such light signals and a second of the elements has at least one photoreceiver for receiving the light signals. A fundamental concept in this case consists in the fact that a unit causing the delivery of the light signals is configured such as to effect the turning on or off of only one portion of the light sources.

In other words, an important concept of the present invention consists in configuring the device in such a manner that it has a unit by means of which the light sources can be activated or deactivated in targeted group fashion. A reduction in the power consumption and an energy-efficient transfer of light signals between the elements are thus achieved in an advantageous manner by the device according to the invention.

By preference, the unit is configured in such a manner as to perform the selection of the portion of the light sources turned on/off on the basis of a received signal, whereby in one embodiment the signal reproduces a position of the first element adopted as a result of the relative movement with respect to the second element. As a result of the targeted activation or deactivation of only one portion of the light sources depending on the position of the two elements relative to one another, a reliable transfer of data by means of light signals is also achieved in addition to the reduction in power consumption. For this purpose, in particular only those light sources can be activated which are directed at the photoreceiver at a particular point in time. Moreover, it is possible to increase the intensity of the luminous flux of the currently activated portion of the light sources in such a manner that a correspondingly lower sensitivity is required for the photoreceiver arranged on the second of the two elements. By this means, the signal-to-noise ratio of the light signals, in other words the ratio of the useful signal to an electrical or optical noise signal, can be significantly increased. Furthermore, the sensitivity of the device to the electromagnetic fields occurring in the machine and the EMC interference effects are thus reduced.

In one embodiment, a facility for determining a relative position of the first element with respect to the second element can be provided, by means of which the signal can be generated. The reliability of the data transfer is further increased through this facility, which is capable of determining the current position of the two elements relative to one another and generating a signal reproducing this position.

By preference, the facility has a further single light source arranged on the second element and also a group of photoreceivers arranged on the first element for determining the relative position. In particular, the number of photoreceivers of the facility for determining the relative position is essentially the same as the number of light sources for delivery of the light signals. By this means, a resolution of the facility suitable for determination of the relative position can be achieved. In particular, the further single light source can be arranged on front face of the second element facing the first element, whereby the photoreceivers can preferably be arranged on a front face of the first element facing the second element. Moreover, it is possible to arrange the photoreceivers evenly spaced from one another.

In one embodiment, the relative movement is a rotary movement and the relative position is an angular position, whereby the first element is preferably a fixed printed circuit board and the second element is a printed circuit board mounted to be capable of rotary movement. In particular, the printed circuit board mounted to be capable of rotary movement can be a part of a hollow shaft of the machine. In the case of a rotary movement of the two elements relative to one another provision can be made for example such that the unit effecting the turning on or off is configured so as to activate or deactivate the portion of the light sources in accordance with a predetermined timing pattern which is also dependent on the rotational speed. This serves to ensure that no facility is required in order to determine the relative position. It is thus possible to create a device exhibiting reductions in terms of both costs and components. If, on the other hand, the selection of the portion of the light sources turned on/off is carried out on the basis of the relative angular position of the two elements, then it is possible to configure the facility for determining the relative angular position in accordance with a "single-turn principle" in such a manner that the portion of the light sources facing the photoreceiver is immediately recognized and activated as soon as the machine is turned on. If the facility for determining the relative angular position comprises a light source and also a group of photoreceivers, then it proves particularly advantageous that the photoreceivers of the facility are arranged on one of the elements evenly spaced from one another and also at an equal distance from a central point of the element. The facility for determining the relative position must therefore in particular exhibit only a low angular resolution or merely recognize those angular sectors in which the light sources facing the photoreceiver are situated for transferring light signals.

In an alternative embodiment, the relative movement is a linear movement. It is possible with this embodiment to arrange the light sources for the delivery of light signals in series along a straight line.

In a preferred embodiment in which the two elements are moved in rotary fashion with respect to one another, the light signals can be transferred in the axial direction. In particular, the two elements that can move in rotary fashion relative to one another can be arranged axially with respect to one another.

In an alternative embodiment, the light signals can be transferable in the radial direction. In this situation, it proves advantageous if the two elements are arranged concentrically. This serves to ensure that the axial overall length of the two elements can be significantly minimized, as a result of which a device is created which offers reduced costs in respect of production and also saves on space.

By preference, the light sources are arranged on a front face of the first element facing the second element. In particular, with regard to the axial transfer of information and also with regard to the rotary movement of the elements relative to one another, a reliable data transfer is achieved by this means. The light sources are preferably arranged evenly spaced from one another on the first element and preferably at an equal distance from a central point of the first element. The light sources for delivery of the light signals are arranged on the first element, in other words, in particular along a contour of a circle.

In one embodiment, the second element has a further group of light sources for emitting light signals and the first element has at least one further photoreceiver for receiving the light signals. Through simple duplication of the components it is thus possible in an advantageous manner to create a bidirectional data transfer device.

By preference, the light source is a light emitting diode or a laser diode, whereby the photoreceiver is preferably a photodiode. In this situation, the laser diodes are distinguished by special reliability, whereas a cost-reduced device is created by using the light emitting diodes or the photodiodes.

A method according to the invention is used for transferring light signals between two elements of a machine, in particular of a machine tool. With regard to the method, the elements are moved relative to one another, whereby a first of the elements has a plurality of light sources by means of which such light signals are delivered, and a second of the elements has at least one photoreceiver which receives the light signals. In this situation, according to the invention, only one portion of the light sources delivers light signals simultaneously.

With regard to the method, the portion of the light sources is preferably selected depending on a relative position of the first element with respect to the second element, whereby the relative position is preferably measured.

BRIEF DESCRIPTION OF THE DRAWING

Further advantages, features and details of the invention are set down in the following description of a preferred embodiment and also with reference to the drawing.

The single FIGURE shows a device for transferring light signals between two elements of a machine according to an embodiment of the invention.

DETAILED DESCRIPTION OF INVENTION

A device 1 illustrated in the FIGURE comprises two elements 2, 3 of a machine tool which are capable of rotary movement relative to one another, between which light signals are transferred. In the present case, the first element 2 is designed as a fixed printed circuit board and coupled to a control cabinet of the machine tool. On the other hand, the second element 3 is a printed circuit board mounted to be capable of rotary movement, which in the present example represents a part of a hollow shaft of the machine tool. The two printed circuit boards 2, 3 are designed as ring-shaped and are arranged axially with respect to one another in such a manner that the printed circuit board 3 mounted to be capable of rotary movement can rotate around an axis of rotation A in a direction illustrated in the FIGURE by means of an arrow B.

In order to ensure wireless communication between the two printed circuit boards 2, 3, the fixed printed circuit board 2 has a group of light sources 4. The light sources 4 are arranged on a front face 5 of the fixed printed circuit board 2, facing the printed circuit board 3 mounted to be capable of rotary movement. At this point it should be noted that the light sources 4 are arranged on the fixed printed circuit board 2 evenly spaced from one another and also at an equal distance from a central point of the fixed printed circuit board 2 in such a manner that they form a ring defining the edge of the fixed printed circuit board 2. Correspondingly, the printed circuit board 3 mounted to be capable of rotary movement includes a photoreceiver 6 which in the present case is arranged on a front face 7 of the printed circuit board 3 mounted to be capable of rotary movement, facing the fixed printed circuit board 2. In support of reliable data transfer, the photoreceiver 6 is at the same distance from the axis of rotation A as the light sources 4.

In the present case, interest is directed towards a transfer of light signals between the light sources 4 and the single photoreceiver 6, whereby the objective is to ensure an energy-efficient transfer of such light signals. To this end the device 1 includes a unit, not shown in the FIGURE, which is configured so as to activate merely one portion of the light sources 4 currently facing the photoreceiver 6. In the present example, this unit is configured so as to perform the selection of the portion of the light sources turned on/off on the basis of a signal, whereby the signal reproduces an angular position of the printed circuit board 3 mounted to be capable of rotary movement adopted as a result of the relative rotary movement with respect to the fixed printed circuit board 2. Moreover, the device 1 has a facility for determining the relative angular position of the printed circuit board 3 mounted to be capable of rotary movement with respect to the fixed printed circuit board 2, by means of which the signal can be generated.

In the present case, the facility for determining the relative angular position includes a light source 8 arranged on the front face 7 of the printed circuit board 3 mounted to be capable of rotary movement. Correspondingly, the facility has a group of photoreceivers 9 arranged on the front face 5 of the fixed printed circuit board 2. The photoreceivers 9 and also the single light source 8 are arranged at an equal distance from the axis of rotation A, whereby the photoreceivers 9 are moreover arranged on the front face 5 of the fixed printed circuit board 2 evenly spaced from one another. Here, the number of photoreceivers 9 is the same as the number of light sources 4.

The mode of operation of the device 1 will be described in detail in the following. If the machine tool is in the operating state, then the printed circuit board 3 mounted to be capable of rotary movement with respect to the fixed printed circuit board 2 rotates around the axis of rotation A. Wireless communication now takes place between the light sources 4 and the photoreceiver 6 by means of light signals. In this situation only the required light sources 4, in the present case only two light sources 4, are activated by means of the unit at a particular point in time. In this way the light sources 4 are turned on or off depending on the angle of rotation or on the angular position. Which of the light sources 4 is currently facing the photoreceiver 6 is ascertained by means of the facility for determining the relative angular position, in other words by means of the light source 8 and the photoreceivers 9. In this situation, the facility for determining the relative position operates in accordance with a "single-turn principle" in such a manner that it immediately recognizes the light sources 4 facing the photoreceiver 6 or a correct sector as soon as the machine tool is turned on.

Provision can be made for the device 1 to be constructed as a bidirectional data transfer device. To this end, merely a further group of light sources and also a further photoreceiver would need to be used, and in fact the light sources would be on the element 3 and the photoreceiver on the element 2.

The invention claimed is:

1. A device for transferring light signals between two elements of a machine which are movable relative to one another, comprising:
a first element having a plurality of light sources for delivering light signals;
a second element having a photoreceiver for receiving the light signals; and
a unit causing the delivery of the light signals, wherein the unit effects a turning on or off of only one portion of the light sources,
wherein the unit performs a selection of the portion of the light sources turned on or off on the basis of a received light signal,
wherein a device for determining a relative position of the first element with respect to the second element is provided and thus the light signals are generated, and
wherein the device for determining the relative position further has a single light source arranged on the second element and also a group of photoreceivers arranged on the first element.

2. The device as claimed in claim 1, wherein the light signal reproduces a position of the first element adopted as a result of the relative movement with respect to the second element.

3. The device as claimed in claim 1, wherein the relative movement is a rotary movement and a relative position of the two elements to one another is an angular position.

4. The device as claimed in claim 3, wherein the light signals are transferred in the axial direction.

5. The device as claimed in claim 3, wherein the light signals are transferred in the radial direction.

6. The device as claimed in claim 1, wherein the first element is a fixed printed circuit board and the second element is a printed circuit board mounted to be capable of rotary movement.

7. The device as claimed in claim 1, wherein the light sources are arranged evenly spaced from one another on a front face of the first element facing the second element.

8. The device as claimed in claim 1, wherein the light sources are arranged on the first element at an equal distance from a central point.

9. The device as claimed in claim 1, wherein the second element has further light sources for emitting light signals and the first element has a further photoreceiver for receiving the light signals such that the device is a bidirectional data transfer device.

10. The device as claimed in claim 1, wherein the second element has further light sources for emitting light signals and the first element has a further photoreceiver for receiving the light signals such that the device is a bidirectional data transfer device.

11. The device as claimed in claim 1, wherein the light sources are light emitting diodes or a laser diodes.

12. The device as claimed in claim 1, wherein the photoreceiver is a photodiode.

13. The device as claimed in claim 1, wherein the machine is a machine tool.

14. A method for transferring light signals between two elements of a machine, the two elements moving relative to one another, comprising:
- delivering light signals by a first element having a plurality of light sources, wherein only one portion of the light sources delivers light signals simultaneously;
- receiving the light signals by a second element having a photoreceiver;
- causing the delivering of the light signals by a unit, wherein the unit effects a turning on or off of only one portion of the light sources,
- wherein the unit performs a selection of the portion of the light sources turned on or off on the basis of a received light signal,
- wherein a device for determining a relative position of the first element with respect to the second element is provided and thus the light signals are generated, and
- wherein the device for determining the relative position further has a single light source arranged on the second element and also a group of photoreceivers arranged on the first element.

15. The method as claimed in claim 14, wherein the relative position is measured.

16. The method as claimed in claim 14, wherein the machine is a machine tool.

* * * * *